Patented Feb. 10, 1931

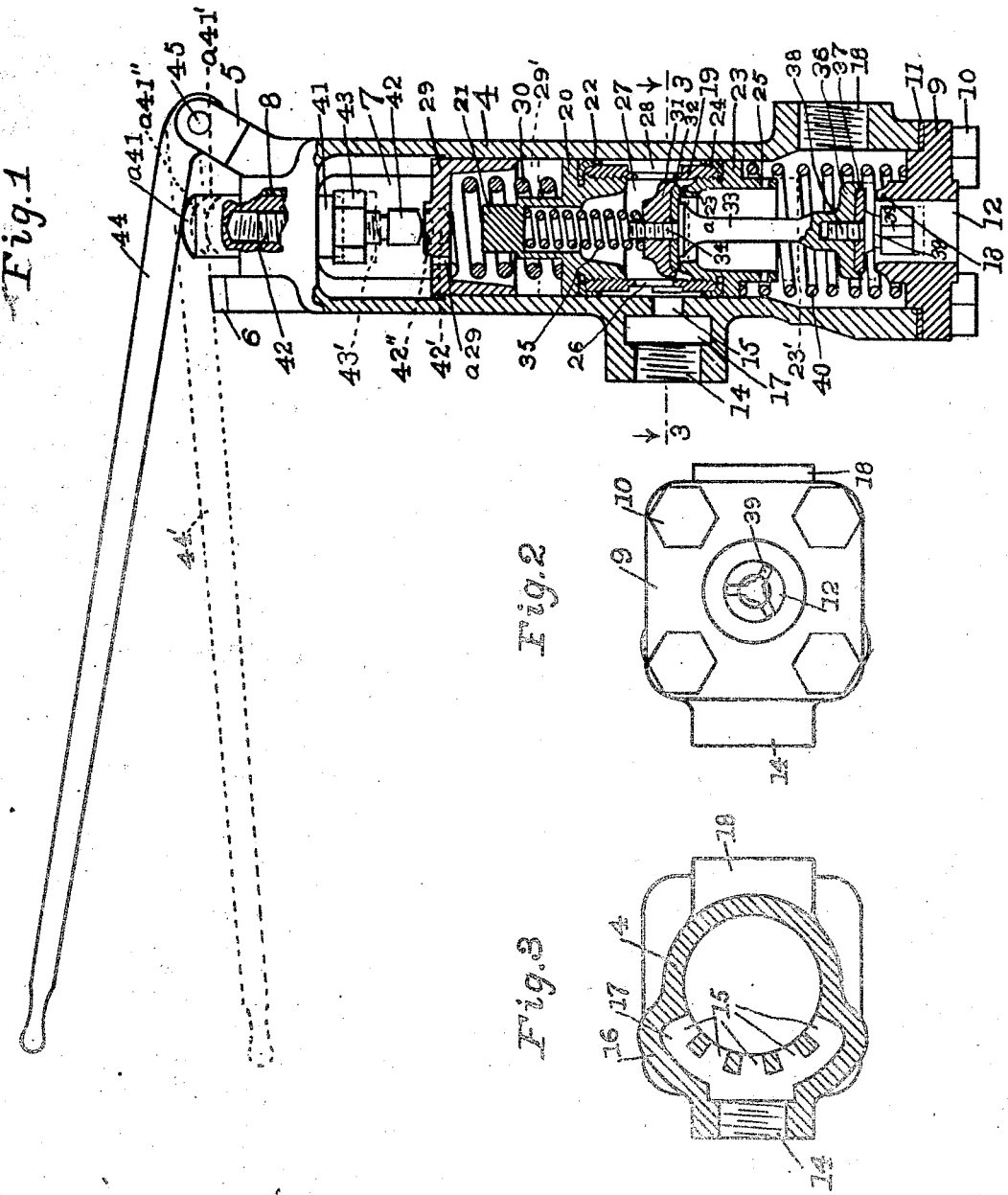

1,791,901

UNITED STATES PATENT OFFICE

SYDNEY S. McINTYRE, OF SEDRO WOOLLEY, WASHINGTON

VARIABLE-PRESSURE VALVE

Application filed May 26, 1928. Serial No. 280,677.

My invention relates to improvements in variable pressure valves especially designed for controlling air pressure brakes, and has for an object to provide a hand controlled reducing valve capable of delivering either a small portion of the reservoir pressure to the work cylinders or any greater portion thereof, as desired, up to the whole thereof.

Another object of my improvement is to provide a variable pressure valve which may be changed only gradually as the power is delivered therethrough.

Another object of my improvement is to provide a hand-operable, variable pressure valve having a stop to limit the possible movements thereof to the desired extent.

Another object of my improvement is to provide a hand-controlled variable pressure valve having an adjustable stop to limit, as desired by the operator, the amount of power which may be delivered therethrough by the operatives.

Other objects of my improvement will appear as the description proceeds.

I attain these and other objects of my improvement with the mechanism illustrated in the accompanying sheet of drawing forming a part of this specification in which Figure 1 is a longitudinal central cross section of my valve, Fig. 2 is a view of the exhaust end of the valve, and Fig. 3 is a transverse section of the valve on the line 3—3 of Fig. 1.

Similar characters refer to similar parts throughout the several views. Certain parts are broken away to show other parts hidden thereby.

With more particular reference to the designated parts: The main body of the valve is cylindrical and is shown at 4 in a vertical position. In practice it may be set up in any desired position but for the benefit of this description it will be considered as in the vertical as shown.

Cylinder 4 has a through longitudinal bore of mean diameter in its central part, of larger diameter at its lower end and of smaller diameter at its upper end.

Arm 5 projects diagonally upward from one side of the upper end of the valve body and has a yoke on its outer end to which the valve handle is pivoted. Boss 6 is diametrically opposite arm 5 and serves as a stop to limit the downward oscillations of the handle. Openings 7 extend through the body wall near the top thereof to provide access for adjusting the valve plunger.

Bore 8 is in the upper end of the valve body and is concentric with the larger bores referred to.

The lower end of the valve body is preferably of square cross section and to it is fastened by cap screws 10 bottom plate 9 with gasket 11 intervening. Plate 9 has a through central opening 12 used for an exhaust outlet and an annular exhaust valve seat 13 surrounds the same within the valve body.

Valve inlet 14 is connected with an air reservoir (not shown) assumed to contain air under pressure of the maximum amount desired for operation and this opening connects with the valve chamber through holes 15 in the valve body wall. Holes 15 are preferably limited to a horizontal sector of the wall and are covered by housing wall 16 which provides chamber 17 to communicate between inlet 14 and said holes 15.

Valve outlet 18 is preferably near the lower end of the valve body and is connected to the work cylinders (not shown).

Piston body 19 is a hollow cylinder with internally threaded ends. With the upper end of the piston body piston head 20 is engaged. Said piston head is hollow, extends above the piston and is threaded to engage therewith. It is provided with a flange to overhang the upper end of the piston between which and said flange is clamped the flange part of ring piston packing 22. This piston packing makes a pressure closure between the valve bore and the upper piston head as said piston reciprocates in said bore.

With the lower end of the piston body is engaged head ring 23 which is threaded for the purpose of said engagement. Ring 23 has a flange to overhang the lower piston end between which and the flange the flange of ring packing 24 is clamped. This piston packing makes a pressure closure between the valve bore and the lower end of the piston as the latter reciprocates in said bore.

The upper end of ring 23 is annular within the piston to provide valve seat a23 and the lower end 25 of said ring extends downward to provide a centering boss for spring 40.

The walls of piston body 19 have openings 26 midway of their length providing communication with piston chamber 27. The external diameter of the piston body 19 is less than that of the bore in which it may reciprocate to provide an annular chamber 28 which is enlarged by a central external annular groove in the piston body.

Spring cap 29 is mounted for reciprocation in the upper end of the central bore of the valve body 4 and provides a housing for the upper end of spring 30. It is preferred that cap 29 operate as a slide in the valve bore and not make a closure therewith as no pressure is desired between this cap and the upper end of the piston. To prevent said pressure opening a29 is provided through the upper wall of the cap.

Spring 30 is mounted in the upper end of the middle valve bore to react between cap 29 and piston head 20.

Valve 31 is mounted over valve seat a23 with packing washer 32 intervening. Valve 31 is within the piston chamber 27 and has a central tapped hole in which is engaged screw 34 on the upper end of dual valve stem 33 and with this screw packing washer 32 is clamped to the valve between said valve and the upper shoulder of the said valve stem. The upper end of screw 34 is extended beyond the top of inlet or piston valve 31 to provide a centering boss for spring 35. The top 21 of piston head 20 is hollow and projects above the piston to provide a housing for coil spring 35 which is mounted within the piston chamber to react between the under side of the head thereof and the upper side of piston valve 31.

The lower end of dual valve stem 33 is enlarged to provide exhaust valve 36 which overhangs exhaust valve seat 13 with valve packing washer 37 intervening. A central tapped hole in the lower side of exhaust valve 36 engages screw 38, between the head of which and said valve washer 37 is clamped. The head of screw 38 is expanded to form three wings 39 which bear on the walls of hole 12 to guide the movements of valve 36.

Spring 40 is mounted around valve seat 13 below and around the extension 25 of the lower piston head above to react between the bottom wall of the valve body and the lower end of the piston.

Plunger 41 is mounted for reciprocation in upper bore 5 with its upper end projected above the upper end of the valve body. The lower end of the plunger is drilled longitudinally and threaded to engage set screw 42 which operatively is an extension of the plunger. Set nut 43 on the screw may be jammed against the lower end of the plunger body to retain the screw and maintain a desired operative length of the plunger.

The head of screw 42, which operatively is the lower end of the plunger, bears on top of cap 29.

Valve handle 44 is pivoted to arm 5 at 45 and its downward oscillations are limited by stop 6. Handle 44 bears on the rounded upper end a41 of plunger 41.

From this disclosure it is evident that piston 19 is reciprocal in the valve under control of springs 30 and 40 and that at times the strength of spring 35 is added to that of spring 40.

Forces to reciprocate the piston must be applied through these springs which are related as to length and strength to maintain operative connection between inlets 15 and chamber 28 and thus with piston chamber 27 also.

Hence the pressure air service maintains air under pressure in piston chamber 27 but it can have no effect to cause said piston to reciprocate in the valve while piston valve 31 is seated.

The valve is shown in full lines with springs 30 and 40 relaxed and spring 35 in its most extended position but with sufficient compression to maintain piston valve 31 seated with small spring pressure.

In this position with no downward pressure on handle 44 spring 40 is, by construction, sufficiently long to hold exhaust valve 36 off of its seat and the valve is closed against the passage of power therethrough while the work cylinders are free from pressure air.

Now exert and maintain downward pressure on handle 44 and cause it to move to stop 6 and remain in its position at 44′. The top of plunger 41 is then at a41′ and the bottom thereof at 42′, spring cap 29 is at 29′, while the bottom of the piston is at 23′, having moved slightly less than the spring cap owing to the yielding of spring 30, although this spring is preferably stiff and said difference in movement correspondingly small.

During the first part of this movement exhaust valve 36 was closed by pressure of spring 35 and by the air pressure following which inlet valve 31 opened, owing to rigid valve stem 33, and pressure air passed from the piston chamber through outlet 18 into the work cylinders. As soon as these cylinders are filled the air reacts between the pistons therein and the lower end of valve piston 19 and moves said work pistons to apply the clutches and also moves said valve piston upward to close inlet or piston valve 31. Then the operative pressure in the work chambers remains constant till the pressure on handle 44 is removed when piston 19 moves upward opening exhaust valve 36 and allowing inlet valve 31 to remain closed, and the pressure on the work pistons is relieved loosening said friction clutches.

It is assumed that the illustrated full-line length of valve plunger 41 will, with the proper related length and strength of springs and amount of service air pressure, cause the maximum operative pressure desired when handle 44 is against stop 6.

To cause less pressure in the work cylinders move handle 44 only far enough to cause exhaust valve 36 to seat and inlet valve 31 to open but slightly. Then the pressure air will pass this valve and enter the work chambers and react therein as before to cause the upward movement of valve piston 19 and close valve 31 when the operative pressure will remain constant but will be of less amount than before because a smaller volume of pressure air passed the inlet valve before it was closed by the reacting work pressure.

It is now apparent that the operative pressures delivered to the work cylinders will be a greater or less part of the service pressure dependent on the greater or less downward movement of valve handle 44.

Yet more fundamental than the handle movements are the movements of piston 19 to lower positions in the valve, and the low point reached by the piston is dependent on the length of plunger 41 as well as upon the latitude of handle movement.

Shorten plunger 41 by moving screw 42 farther therein to cause set nut 43 to be at 43' when its upper end will be at $a41''$ and its lower end at $42''$. Then when handle 44 is moved to 44' the downward movement of the piston will be little more than required to close the exhaust valve and open the inlet valve very little. As explained, this small opening of the inlet valve will allow a small volume of pressure air to enter the work chambers but enough to cause the reaction above described and the inlet valve will be closed and remain closed with a greatly reduced constant air pressure in the work cylinders till handle 44 is raised.

When the service pressure is greatly in excess of that required to operate the work pistons the adjustment of the plunger length referred to provides a means to prevent excessive pressures in the work cylinders.

Again, adjust screw 42 to extend further from plunger body 41 thereby lengthening the operative plunger and when handle 44 is held against stop 6 inlet valve 31 may be fully open and allow so large a volume of the pressure air to enter the work chambers that nearly the full service pressure may be attained therein by the time reaction therefrom closes the inlet valve.

The presence of the valve springs as links in the valve operating mechanism makes impossible sudden changes in the force delivered through it.

Other details of operation might be more fully referred to but it is now apparent to those skilled in this art that my valve provides convenient means to smoothly vary by hand the part of the service pressure permitted to enter the work chambers and to set the valve for a maximum operative pressure which may be either a small part or nearly the whole of the service pressure, and to maintain constant the pressure in the work chambers after it has been satisfactorily established therein.

Having thus disclosed my invention, what I claim as new therein and desire to secure by Letters Patent is,—

1. In a variable pressure valve a hollow cylindrical valve body having an inlet opening midway of its length, an exhaust opening in one end with an interior valve seat thereat, an outlet opening adjacent said exhaust opening, and a plunger guideway in its other end, a hollow piston mounted midway in said valve body for reciprocation opposite said exhaust valve seat and adjacent said inlet opening having an opening through its side wall providing communication between the chamber of said piston and said inlet opening during operative reciprocation of said piston and also having an opening in its end opposite said exhaust valve seat with a valve seat thereat within said piston, an exhaust valve seatable on said exhaust valve seat integral with a valve which is disposed within said piston and seatable on said piston valve seat therein, a relatively weak spring in said valve body reacting between the exhaust end of said body and the outlet end of said piston, a relatively stronger spring in said piston reacting between the head thereof and said valve therein, a spring yet stronger than said above-mentioned springs reacting between the head of said piston and a spring cap, said spring cap mounted for reciprocation in said valve body and bearing on the inner end of a plunger, said plunger mounted for reciprocation in said plunger guideway with its outer end protruding beyond the end of said valve body, and a handle pivoted on said valve body and bearing on the protruding end of said plunger.

2. In a variable pressure valve, a valve body having inlet, outlet and exhaust ports with a valve seat within said valve body at said exhaust port, a hollow piston mounted for reciprocation midway in said valve body opposite said exhaust port and adjacent said inlet port having openings through its wall providing communication between said inlet port and the interior of said piston during operative reciprocation thereof also having an outlet in the end thereof opposite said exhaust port with an interior valve seat thereat, a valve for said piston valve seat and an exhaust valve rigidly connected and facing the same way seatable simultaneously when said piston is in its medial position, seatable on said exhaust port only when said piston is in its position nearest thereto and seatable on said piston-valve seat only when said piston is farthest from said exhaust port, a relatively weak spring mounted to react between said piston and said exhaust end of said valve body, a relatively stronger spring in said piston to react between the head theref and said dual valves, a spring stronger than the other said springs to react between the head of said piston and a spring cap, said spring cap mounted for reciprocation in said valve body to bear on the inner end of a plunger, said plunger of adjustable length mounted for reciprocation in plunger guides in the other end of said piston body having its outer end protruding beyond said valve body, a handle pivoted to said valve body to bear on said outer end of said plunger, and a stop on said valve body to limit the movements of said handle.

SYDNEY S. McINTYRE.